June 4, 1957  H. F. STODDART  2,794,977
OPTICAL TRANSPOSER
Filed Nov. 23, 1955
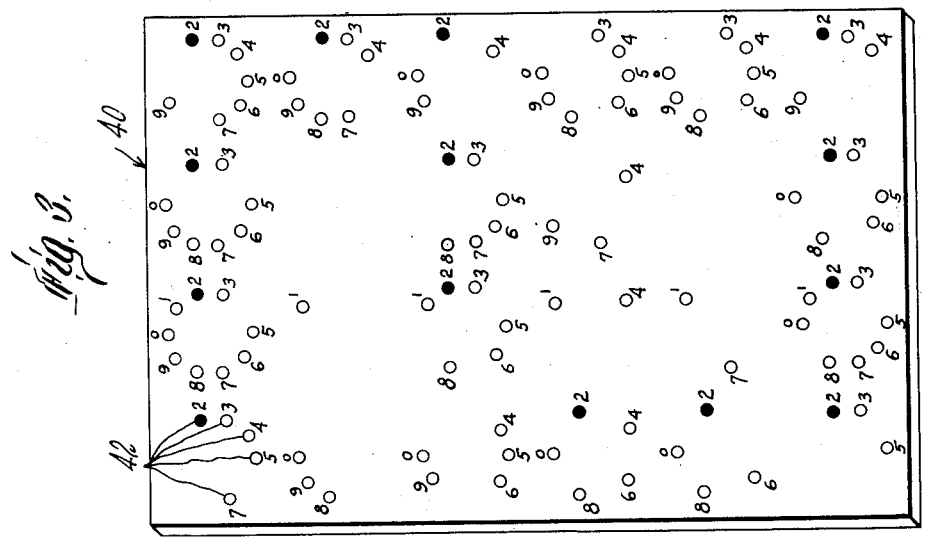
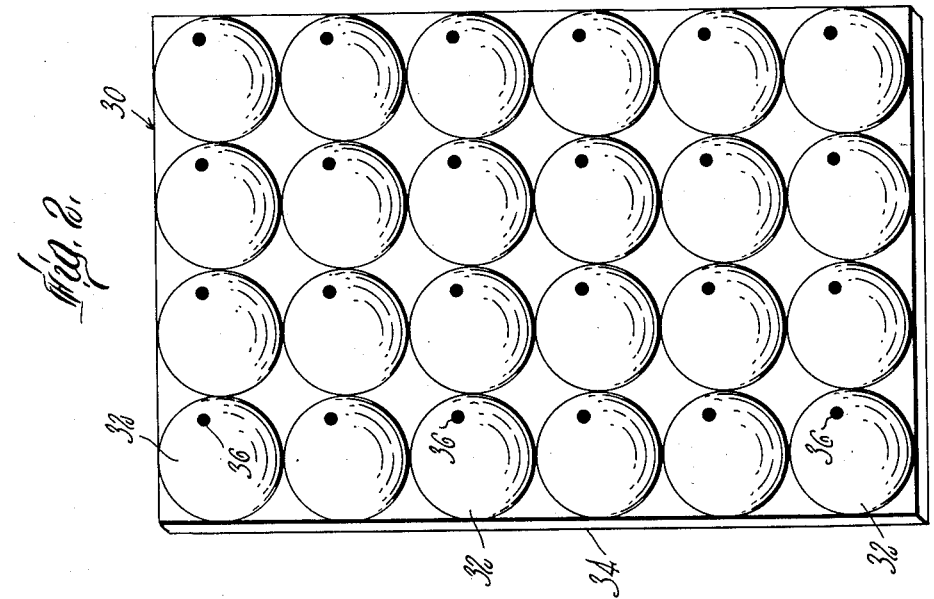
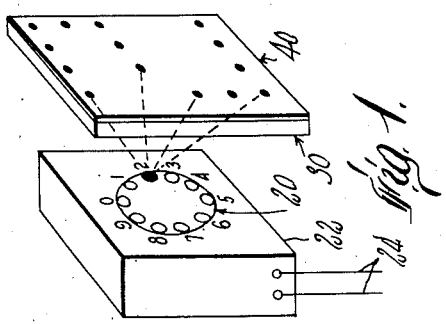
Hugh F. Stoddart, Inventor
by Martin Kirkpatrick, atty.

United States Patent Office 2,794,977
Patented June 4, 1957

2,794,977
OPTICAL TRANSPOSER

Hugh F. Stoddart, Newton Upper Falls, Mass., assignor to Atomic Instrument Company, Cambridge, Mass., a corporation of Massachusetts Application November 23, 1955, Serial No. 548,682

14 Claims. (Cl. 340—378)

This invention relates to the transposition of a positional code into a symbolic code or the reverse, and more particularly involves the utilization of novel optical means therefor.

The transposition of data representing numbers, letters, or other symbols from a positional code as on a matrix to a symbolic code as on a light display or on a printed page has long been a problem particularly with electronic apparatus in which the transposition must be carried out at exceedingly high speeds of say, several thousand per second. Heretofore, for example, transposition in the direction from the positional code to the symbolic code has generally been carried out by complicated electronic mechanisms providing either a positional or symbolic display, while transposition in the direction from the symbolic code to the positional code has generally been carried out by equally complicated electronic scanning mechanisms. Hence, even though such devices are in use, they are by no means an entirely satisfactory solution to the problem, particularly since their very complication prevents their use in many circumstances.

According to the present invention, a novel optical transposer is provided for transposing a positional code into a symbolic code, or the reverse. For example, the invention may be used for transposing the position of a light source on a suitable matrix into an illuminated symbol such as an arabic numeral, all as set forth in my earlier filed application Serial No. 409,675, now abandoned, or it may be used for transposing such a symbol as on a printed page into one of a number of positions on a suitable matrix to provide a signal which can be fed to a computer, for instance.

It is a feature of my invention that the transposition is accomplished entirely by optical means and requires no electronic apparatus whatsoever. Hence, its reliability is greatly improved over that of heretofore known apparatus.

For the purpose of more fully explaining a preferred embodiment of my optical transposer, a reference is now made to the accompanying drawing, in which:

Fig. 1 is a schematic isometric view of the optical transposer of my invention;

Fig. 2 is an enlarged isometric view of a portion of the transposer of Fig. 1; and Fig. 3 is an enlarged isometric view of a further portion of the transposer of Fig. 1.

As shown in the drawings, the specifically described embodiment of my novel optical transposer is arranged to transpose arabic numerals 0 through 9 and the ten positions of a circular matrix 20 (herein designated as "0" through "9"), of an electro-photic device or devices shown positioned in the "2" position. The electro-photic devices employed for the matrix 20 may be of a number of types, for example, photo-sensitive devices such as photo-cells, photo-emissive devices such as light bulbs, or the elements of a ten position cold cathode glow transfer tube and may be operated by a suitable electronic device 22. With the latter arrangement, a light source provided by the tube may be effectively moved from one position to another position by suitable pulses to be counted applied to the input of said device 22 through connectors 24, and the tube may be operated in the reverse direction by applying illumination to one or more of the electrodes as photo-sensitive elements, the presence or absence of illuminations on one of the electrodes being sensed by the device 22 to provide an output through connectors 24.

Other types of electro-photic devices can also be used to provide the matrix. Thus, to transpose from position to symbol, a positionable illuminated light source, for example, a pattern of conventional light bulbs with a simple mechanical switching arrangement for counting could be used or a cathode ray counting tube counter could be used, the latter arrangement being of the type providing a single spot positioned on the face of the tube, while to transpose from symbol to position a pattern of conventional photo-cells could be used. However, whatever arrangement is used to provide a matrix, it is essential that the positions "0" through "9" be sufficiently spaced from one another to prevent the illumination or lack of illumination in one position from interfering with any other position. In short, the illumination or lack of illumination must be substantially confined to a single position at a time.

Positioned in front of the matrix 20 is provided a lens array 30 with an opaque mask 40 positioned thereover, as hereinafter more fully explained. The lens array 30 comprises a plurality of similar circular lenses 32 in rectangular side by side relation on a transparent backing member 34, the lenses 32 here being shown as in a rectangular pattern with six lenses 32 in the vertical dimension and four lenses 32 in the horizontal, such pattern being a minimum practical size for clearly displaying the arabic numerals for easy reading. A greater number of lenses will further improve both the definition and ease of reading.

With such a lens array 30 positioned in front of the matrix 20, an image 36 of a position will appear from each lens 32, and such image will be positioned from said lens in a circular pattern in accordance with the position in the circular pattern on the matrix 20. Hence, the lens array 30 will display a plurality of positioned images 36 of the position on the matrix 20. As with the positions on the matrix, the positions of each image 36 on a lens 32 must be suitably defined from one another, but such is readily accomplished with conventional lenses, even exceedingly small ones, if aberrations are controlled. For example, if the circular pattern on a ten position counting tube be of about one inch diameter (as with counting tubes GC10B, GC10C, GC10/4B, and GS10C manufactured by Ericsson Telephone Ltd., and described in Electronic Engineering, May 1950 and February 1952, one face of the lenses 32 may be an 0.125 inch diameter section of the surface of a sphere of 0.125 inch radius, the other face of said lens being flat, with said lenses being positioned as in Fig. 2 with their rear faces preferably about 2 inches from the face of the counting tube forming matrix 20.

An opaque mask 40 is positioned over the lens array 30, said mask having a plurality of apertures 42 therein arranged to define each of the numerals "0" through "9." The apertures 42 defining a given numeral are positioned only over the positions of the images 36 on said lenses 32 corresponding to the position on matrix 20 indicating said given symbol and are of a diameter small enough to prevent interference from the presence of images in adjacent positions, a diameter of about 0.020 inch being a practical size with a one inch counting tube and 0.125 lenses as set forth above, although smaller apertures 42 can be used with resulting decreased visibility, and such a mask can be made photographically as well as otherwise.

As an example, in the drawing, the position is shown at position "2" on the matrix 20 and the images 36 of said position appear on each of the lenses 32 of the lens array 30 in a position "2" derived from and hence corresponding to the position "2" on the matrix 20. The numeral "2" is defined by the apertures 42 in said mask 40 directly over the "2" position of the lens array 30, said apertures (numbered 2 on Fig. 3) being in a pattern that defines the numeral "2," the images 36 not needed in defining the pattern corresponding to the numeral "2" being blocked out by the mask 40 since no apertures are positioned thereover. Apertures 42 defining the others of the desired numerals 0 through 9 are similarly positioned on the mask 40, so that the completed mask (Fig. 3) has a plurality of apertures 42 therein defining each of the numerals 0 through 9 with the apertures defining any given numeral positioned only over images on lenses 32 corresponding to the position on the matrix 20 indicating said given numeral, the apertures 42 in the mask 40 used for indicating each of the numerals 0 through 9 being numbered in Fig. 3 corresponding with the numbering of the positions on matrix 20 since they are derived from such positions.

Thus, in operation as an optical symbol generator and displaying device for transposing from a light source position on matrix 20 to an illuminated arabic numeral, with the opaque mask 40 positioned over the lens array 30 and with the light source of matrix 20 illuminated in one position, the numeral corresponding to the position of said light source will be visually displayed through the apertures 42 in mask 40, the apertures 42 cooperating with each lens 32 being sufficiently spaced and of small enough diameter so that only one aperture at a time will be illuminated by each lens as explained above. For example, if device 22 is actuated to illuminate the "2" position on the matrix 20, images 36 will appear in a corresponding position on each of lenses 32 (Fig. 2) and those of said images defining the numeral "2" will be visually displayed through the apertures 42 in the "2" position in mask 40 (Fig. 3), said illuminated "2" positions being shown as solid black circles on the drawing, with the non-illuminated positions shown as white circles. Similarly, if the device 22 is actuated to illuminate another position, the numeral corresponding to such other position will be displayed and with all other numerals extinguished, since but one numeral at a time can be displayed corresponding to the single numeral indicated by the matrix 20.

In operation as an optical symbol reader for transposing from an arabic numeral provided on the face of mask 40 to a position on matrix 20 energized thereby, the numeral is provided on the face of mask 40 by suitably illuminating said face by said numeral, and position on matrix 20 will thus be illuminated by said numeral through the apertures 42 in mask 40. For example, if the face of mask 40 is illuminated by the numeral "2" to coincide with the apertures 42 in the "2" position (Fig. 3), said illuminated "2" positions being shown as solid black circles in the drawing with the non-illuminated positions shown as white circles, the position "2" on matrix 20 will be illuminated since images 36 will appear in a corresponding position on each of lenses 32 (Fig. 2). This will result in an output from device 22 corresponding to the position "2," said output being in terms of a positional code for operating, for instance, a computer. Similarly, other symbols may be applied to mask 40 to provide a positional output.

If it is desired simultaneously to transpose a plurality of numerals, as with, for example, an electronic counter having six cold cathode glow transfer counting tubes to indicate a number of six digits, then six of my novel optical transposers each cooperating with a single matrix 20 as above described may be used to provide for the transposition of the multi-digit number.

Although the preferred embodiment of this invention has been described in terms of arabic numerals displayed in a circular pattern, it will be apparent that alphabetic or other arbitrary symbols could be used, and that any of such symbols can be displayed in a wide variety of patterns. Similarly, the individual lenses as well as the lens array can be of other configurations, with the mask having suitable apertures corresponding to the positions of the images on said lens array to visually display a symbol. Still other modifications within the spirit of my invention and the scope of the appended claims will be apparent to those skilled in the art.

I claim:

1. An optical transposer including electro-photic transducing means adapted to be positioned in one of a plurality of predetermined spaced positions to indicate a plurality of symbols, a lens array adapted to produce a plurality of images of said transducing means, and mask means positioned over said lens array having a plurality of apertures therein, the apertures defining a given symbol being positioned only over the images on said lenses corresponding to the electro-photic transducing means position indicating said given symbol.

2. An optical transposer including an electrophotic matrix adapted to indicate a plurality of symbols, a lens array comprising a plurality of lenses in side by side relation, said lens array being adapted to produce a plurality of images of said matrix, and mask means positioned over said lens array and having a plurality of apertures therein to define a plurality of symbols, the apertures defining a given signal being positioned over said lenses corresponding to a position on said matrix indicating said given symbol.

3. An optical symbol generator including a photoemissive matrix adapted to indicate a plurality of symbols, a lens array comprising a plurality of lenses in side by side relation, said lens array being adapted to produce a plurality of images of said matrix, and mask means positioned over said lens array and having a plurality of apertures therein to define a plurality of symbols, the apertures defining a given signal being positioned over said lenses corresponding to a position on said matrix indicating said given symbol.

4. An optical symbol generator including a light source adapted to be positioned in one of a plurality of predetermined spaced positions to indicate a plurality of symbols, a lens array adapted to produce a plurality of images of said light source the positions of said images on said lenses corresponding to the light source position, and mask means positioned over said lens array having a plurality of apertures therein, the apertures defining a given symbol being positioned only over the images on said lenses corresponding to the light source position indicating said given symbol, whereby a symbol corresponding to the position of said light source will be visually displayed.

5. An optical symbol generator including a light source adapted to be positioned in one of a plurality of spaced positions to indicate a plurality of symbols, a lens array comprising a plurality of lenses in side by side relation, said lens array being adapted to produce a plurality of positioned images of said light source, and mask means positioned over said lens array, and having a plurality of apertures therein to define a plurality of symbols, the apertures defining a given symbol being positioned only over the images on said lenses corresponding to the light source position indicating said given symbol, whereby a symbol corresponding to the position of said light source will be visually displayed.

6. An optical symbol generator including a light source adapted to be positioned in one of a plurality of spaced positions, each of said positions indicating a symbol, a lens array comprising a plurality of lenses in side by side relation, said lens array being adapted to produce a plurality of images of said light source, with an image being positioned on each of said lenses according to the position of said light source, and an opaque mask positioned over said lens array, and having apertures therein to define a plurality of symbols, the apertures defining a given symbol being positioned only over the images on said lenses corresponding to the light source position indicating said given symbol, whereby a symbol corresponding to the position of said light source will be visually displayed by said symbol generator.

7. An optical symbol generator including a light source adapted to be positioned in one of a plurality of spaced positions in a circular pattern, each of said positions indicating a symbol, a lens array comprising a plurality of lenses in rectangular side by side relation, said lens array being adapted to produce a plurality of images of said light source, with an image being positioned on each of said lenses according to the position of said light source, and an opaque mask positioned over said lens array, and having apertures therein to define a plurality of symbols, the apertures defining a given symbol being positioned only over the images on said lenses corresponding to the light source position indicating said given symbol, whereby a symbol corresponding to the position of said light source will be visually displayed.

8. An optical symbol generator as claimed in claim 7, in which said light source is an element of a cold cathode glow transfer counting tube.

9. An optical symbol generator including a light source adapted to be positioned in one of ten spaced positions in a circular pattern, each of said positions indicating one of the numeric symbols "0" through "9," a lens array comprising a plurality of substantially circular lenses in rectangular side by side relation, said lens array being adapted to produce a plurality of images of said light source, with an image being positioned on each of said lenses in a circular pattern corresponding to the position in the circular pattern of said light source, and an opaque mask positioned over said lens array, and having apertures therein to define said numeric symbols, the apertures defining a given numeric symbol being positioned only over the images on said lenses corresponding to the light source position indicating said given numeric symbol, whereby a numeric symbol corresponding to the position of said light source will be visually displayed.

10. An optical symbol generator as claimed in claim 9 in which said lens array is at least six lenses in vertical dimension and four lenses in horizontal dimension.

11. An optical symbol reader including a photo-sensitive matrix adapted to indicate a plurality of symbols, a lens array comprising a plurality of lenses in side by side relation, said lens array being adapted to produce a plurality of images of said matrix, and mask means positioned over said lens array and having a plurality of apertures therein to define a plurality of symbols, the apertures defining a given signal being positioned over said lenses corresponding to a position on said matrix indicating said given symbol.

12. An optical symbol reader including photo-sensitive means positioned in one of a plurality of spaced positions to indicate a plurality of symbols, a lens array comprising a plurality of lenses in side by side relation, said lens array being adapted to produce a plurality of positioned images of said photo-sensitive means, and mask means positioned over said lens array, and having a plurality of apertures therein to define a plurality of symbols, the apertures defining a given symbol being positioned only over the images on said lenses corresponding to the photo-sensitive means position indicating said given symbol, whereby a position corresponding to the symbol will be provided.

13. An optical symbol reader including photo-sensitive means positioned in one of a plurality of spaced positions, each of said positions indicating a symbol, a lens array comprising a plurality of lenses in side by side relation, said lens array being adapted to produce a plurality of images of said photo-sensitive means, with an image being positioned on each of said lenses according to the position of said photo-sensitive means, and an opaque mask positioned over said lens array, and having apertures therein to define a plurality of symbols, the apertures defining a given symbol being positioned only over the images on said lenses corresponding to the photo-sensitive means position indicating said given symbol, whereby a position corresponding to the symbol will be provided.

14. An optical symbol reader as claimed in claim 13, in which said lens array is at least six lenses in vertical dimension and four lenses in horizontal dimension.

References Cited in the file of this patent
UNITED STATES PATENTS

| | | |
|---|---|---|
| 1,072,426 | Claflin | Sept. 9, 1913 |
| 1,686,525 | House | Oct. 9, 1928 |
| 2,203,630 | Keen | June 4, 1940 |
| 2,533,242 | Gridley | Dec. 12, 1950 |
| 2,682,043 | Fitch | June 22, 1954 |